Aug. 18, 1942.  R. DE PACE  2,293,689
COLLISION GUARD FOR VEHICLES
Filed March 28, 1941
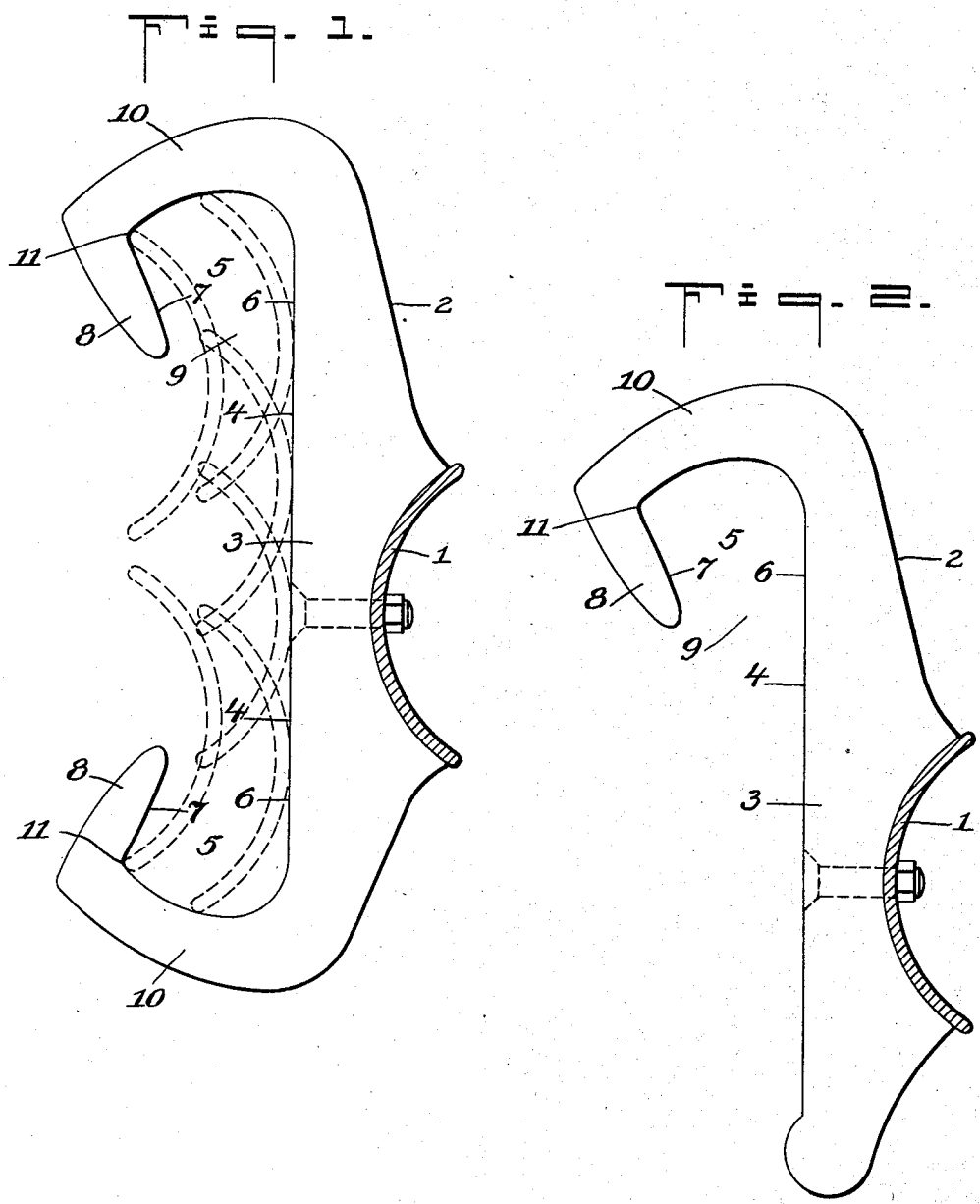

Patented Aug. 18, 1942

2,293,689

UNITED STATES PATENT OFFICE 2,293,689

COLLISION GUARD FOR VEHICLES

Robert De Pace, New York, N. Y.

Application March 28, 1941, Serial No. 385,586

5 Claims. (Cl. 293—55)

This invention relates generally to collision guards or bumpers for motor vehicles and more specifically to extensions of the same known as bumperettes, which may be either removably attached or integrally formed and serve to increase the impact area of the bumpers.

The main purpose or object of the invention is to confine the impact of collision to the bumper area by preventing overriding or underriding of one automobile bumper by another and the resulting interlocking and body damage, when two cars collide.

When the bumpers of colliding cars are at about the same height from the ground, the force of an end on collision tends, ordinarily, to drive the colliding ends of the cars upward and the momentum of the colliding car, giving it forward motion, will cause its bumper to ride over the other bumper and crash into the body of the car struck, doing serious damage to both cars.

If the car struck is heavier than the other car or sufficiently resisting, the impact will often tend to tip the colliding car upward at the rear end and the momentum of its forward drive, will force its bumper under that of the car struck, permitting the front of the colliding car to crash into the same.

To prevent this overriding or underriding tendency of the bumper of the colliding car, it has been suggested that bumperettes be provided with enlarged terminals, designed to check execessive upward or downward movement that follows the impact, in the forward thrust of the colliding bumper and thus avoid body damage, by confining the impact to the bumper area.

The provision of such terminal enlargements for bumperettes has not heretofore proved practically successful, owing largely to the form of the enlargements employed and their relative location to the bumper proper.

As ordinarily positioned and arranged, the enlargements do not project beyond the rounded collision surface of the bumper proper and the latter being foremost, receives the impact of the colliding bumper. On the rebound and upward thrust that follows, the last mentioned bumper, in the majority of instances, clears the terminal enlargements of the bumperettes, overriding or underriding the same and crashing into the body of the car struck.

If the tendency of the colliding bumper to override or underride should be momentarily checked by the forms of bumperette terminal enlargements heretofore suggested, they would offer no resistance to immediate disengagement and the rebound and continued forward thrust that follows, would force the colliding bumper over or under that of the car struck with the result above described.

To render bumperettes effective for the purpose stated, I give them sufficient body to project outwardly beyond the bumper proper and take the shock of impact of a colliding bumper, thus preventing a direct crash into the bumper of the car struck.

In presenting the bumperettes to take the shock of impact, the succeeding upward or downward thrust, following the rebound of the colliding bumper, is against the vertically disposed projecting bodies of the bumperettes of the car struck, upon which the colliding bumper rides and is guided by the same into engagement with the terminal enlargements thereof. The enlargements are recessed to receive the bumper and are of a form such as to provide a positive stop to either further upward movement or to rearward disengaging movement of the bumper that enters the same. As disengaging rebound from the recesses is thus checked, the colliding bumper is thrust forward by the incline given the wall of the recesses, against the vertically disposed bodies of the bumperettes and as the momentum of the colliding car following the impact, has rapidly diminished and the destructive force of the collision is spent, the weight of the colliding car acts to move its forward end, elevated by the collision, downwardly to normal level and thereby withdraws its engaged bumper from the recessed ends of the bumperettes of the car struck, permitting the cars to be drawn apart for inspection, repair, etc.

A construction suitable for carrying my invention into effect is illustrated in the accompanying drawing but I do not wish to be understood as intending to limit myself to either the exact form or the details shown, as various changes may be made therein without departing from the spirit and scope of the invention as outlined in the appended claims.

In the drawing—

Fig. 1 shows a preferred form of bumperette, suitable for carrying my invention into effect, also a sectional indication of a bumper to which it is attached and, in dotted lines, various positions of the colliding bumper in the upward or downward thrust, following the impact and Fig. 2 illustrates a slight modification.

Referring now to the drawing, I indicates a cross-sectional showing of a collision guard or bumper, which may be of any suitable or well known form for use on motor driven vehicles.

2 indicates a preferred form of bumperette, which is shown removably bolted to the outer or collision side of the bumper but may be secured thereto in any other suitable or well known manner.

The bumperette body 3 is given substantial proportions to enable it to receive the impact and withstand the force of ordinary collisions without being seriously damaged.

As shown, it presents a straight vertically disposed wall 4 of unbroken surface, to receive the impact of a colliding bumper and on the upward or downward thrust that follows the impact, the wall 4 serves as a track upon which the colliding bumper rides until it is caught by the enlarged end formation of the bumperette, which is recessed at 5 to receive the same.

The shape of this recess is an important feature of the invention, being such as to prevent further upward and forward movement of a colliding bumper caught therein and hold it against escape until the destructive force of the collision is spent, permitting it then to disengage and free itself by settling downward by its own weight or that of the colliding car, to normal level.

One side 6, of the recess is formed by the vertically disposed body of the bumperette and the opposite side 7, by the straight end section 8 of the terminal formation, which is spaced apart from and preferably, inclined towards the body, so that the entrance opening 9 of the recess is reduced to a size that does not exceed the greatest dimension thereof. The restricted entrance tends to retard premature escape of a colliding fender caught in the recess.

Closing the recess above the entrance there is a bridging section 10, preferably of arcuate form, which joins the end section 8 of the body and forms with the joined parts, an approximately J-shaped terminal.

On the upward or downward thrust of a colliding bumper, it will ride on the vertical wall of the bumperette of the car struck, as shown by the dotted line positions in Fig. 1, and the drive will carry it into the recess and around the arched end thereof to the position indicated at 11. At this point it meets the return bend of the terminal formation and will there, momentarily, be brought to a stop. As the destructive force of the collision will be spent, on the colliding bumper being thus checked, it will ride down the inwardly inclined end section 8, forming the return bend and be deflected by it and thrown forward against the body of the bumperette on the opposite side of the recess. It will then settle downwardly by its own weight, riding against the vertical wall of the bumperette, until it reaches its normal level.

From the foregoing, it will be seen that overriding or underriding the bumper of a car struck by the bumper of a colliding car will be effectually prevented and further that the impact of the collision will be limited and confined to the bumper area.

As shown in the drawing, the above described terminal formation may be provided at the upper end only or at both ends of the bumperette, as may be considered necessary to meet the requirements of present day cars.

Having described my invention, I claim:

1. A bumperette for a vehicle bumper provided with a recessed rigid terminal formation projecting from and having an entrance opening to the recess on the collision side of the bumperette, the said recess being suitably dimensioned to permit free and unrestricted traversing movement of a colliding bumper caught therein, the form of the recess being such that its entrance opening does not exceed its greatest dimension and is appreciably below the top of the bumperette.

2. A bumperette, as defined in claim 1, in which the entrance opening to the recess is made smaller than the greatest dimension of the recess to retard and thereby prevent premature escape of a colliding bumper caught in the recess.

3. A bumperette for a vehicle bumper consisting of a vertically disposed body portion provided with a terminal formation projecting from the collision side of the bumperette, the end section of the formation being spaced apart from and inclined towards the body portion in a direction to form the entrance to a recess between them that enlarges beyond the entrance and is closed at the enlarged end by a bridging section joining the end section to the body portion.

4. A bumperette for a vehicle bumper consisting of a vertically disposed body portion provided with a recessed terminal formation projecting from the collision side of the bumperette, the said recess being formed by an outward extension of the body portion terminating in a return bend that is spaced apart from the body portion a distance not exceeding the greatest dimension of the recess to give entrance to the same.

5. A bumperette, as defined in claim 1, in which the recessed terminal formation is duplicated in opposed relation at the upper and lower ends of the bumperette.

ROBERT DE PACE.